Patented July 29, 1930

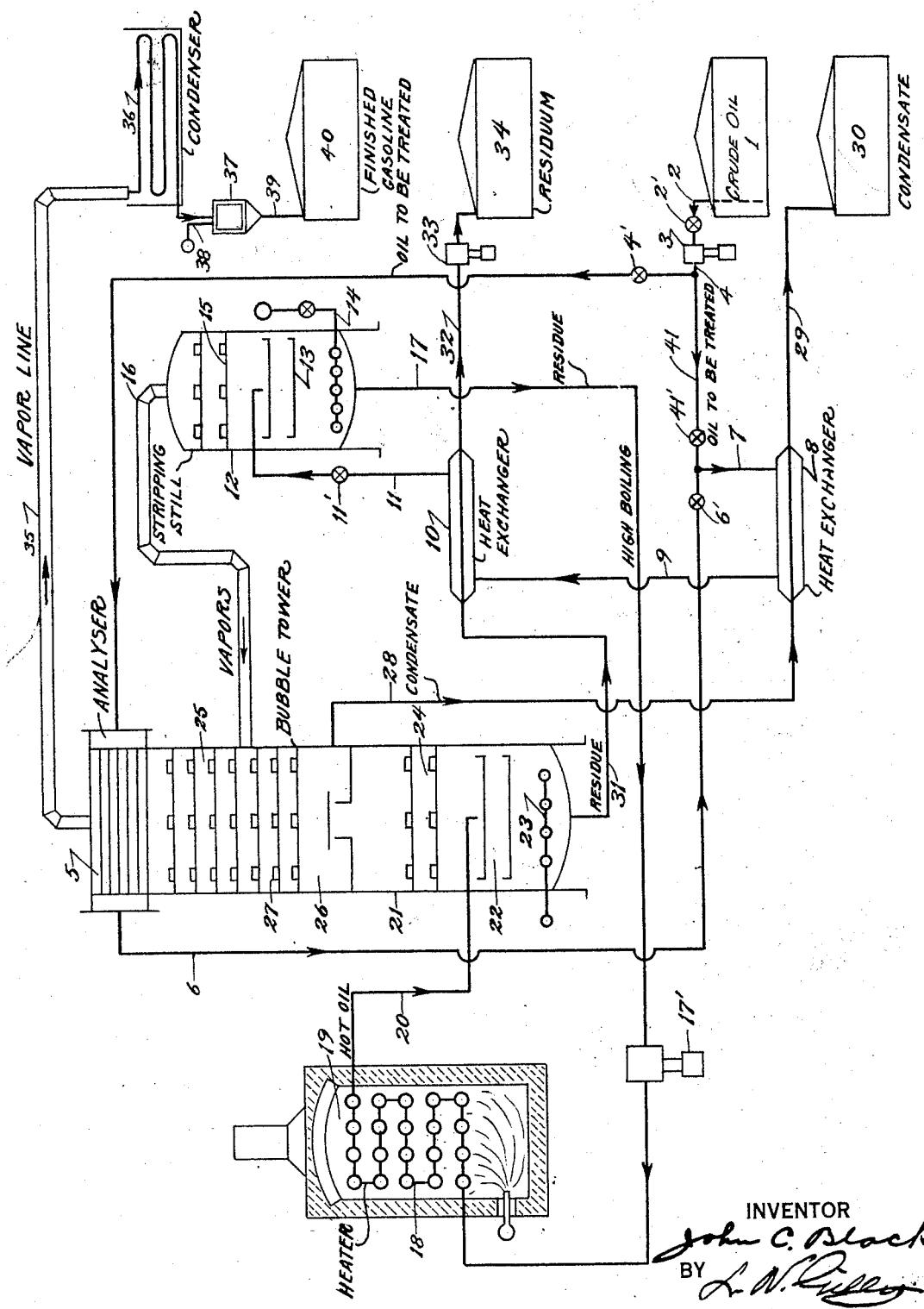

1,771,705

UNITED STATES PATENT OFFICE

JOHN C. BLACK, OF DESTREHAN, LOUISIANA

METHOD AND APPARATUS FOR DISTILLING OIL

Application filed October 26, 1926. Serial No. 144,345.

This invention is directed to a process, and an apparatus for the distillation of liquids, particularly liquids of the nature of oil.

An object of this invention is the better utilization of heat and for an improvement in the practical operation of distillation equipment for carrying out this process.

The invention will be better understood by reference to the accompanying drawing which shows a schematic arrangement of an apparatus for carrying out the above invention. In said drawing,—

1 is a tank containing the material to be distilled, for instance, crude oil. 2 is a line connecting said tank with pump 3. 2' is a valve in said line. 4 is a line connecting pump 3 with analyzer 5 situated in bubble tower 25. 4' is a valve in said line. 6 and 7 are lines connecting analyzer 5 with heat exchanger 8. 6' is a valve in said line. 9 is a line connecting heat exchanger 8 with heat exchanger 10. 11 is a line connecting heat exchanger 10 with stripping still or evaporator 12. 13 are trays in said still. 14 is a steam coil in said still. 15 are bubble trays in said still. 16 is a vapor line connecting still 12 with bubble tower 25. 17 is a line connecting still 12 with coil 18 via pump 17'. 19 is a furnace in which coil 18 is situated. 20 is a cross-over line connecting coil 18 with evaporator 21. 22 are trays in said evaporator. 23 is a steam coil in said evaporator. 24 are bubble trays in said evaporator. 26 is a condensate trap in bubble tower 25. 27 are bubble trays in said bubble tower. 28 is a condensate run-down line from trap 26 through heat exchanger 8 and line 29 to storage tank 30. 31 is a residue line connecting evaporator 21 with heat exchanger 10. 32 is a line connecting heat exchanger 10 with tank 34. 33 is a pump in said line. 35 is a vapor line connecting bubble tower 25 with condenser 36. 37 is a lookbox in condenser line which connects condenser 36 via line 39 with tank 40. 38 is a vapor vent connected to lookbox 37. 41 is a by-pass connecting line 4 with line 7. 41' is a valve in said line.

The operation of this system is as follows:
Crude oil contained in tank 1 is pumped by pump 3 through lines 2 and 4, by the correct manipulation of valves 4' and 41' through analyzer 5. The amount of oil passing through this analyzer is regulated by the regulation of the aforementioned valves, in order to control the reflux action in bubble tower 25. The oil passing from analyzer 5 passes, then, together with by-passed oil, through line 7, heat exchangers 8 and 10. The oil has picked up considerable heat by means of this heat exchange, and has had its vapor pressure so augmented that when it is run into still 12 through line 11 over trays 13, it may be distilled with the aid of but very little steam. Vapor rising in still 12 is cleaned of entrained oil in bubble trays 15 and passes through line 16 to join with the vapors rising through column 25. The unvaporized portion of the oil is then pumped by pump 17' through coil 18. In coil 18 it is heated to the desired temperature in furnace 19. The heated oil then passes through line 20 into the evaporator 21, over trays 22, where it is distilled by means of its contained heat and by the aid of a little steam. It is cleaned in trays 24 of any entrained oil, and rises through trays 27 in bubble tower 25 where it is fractionated by the aid of reflux generated by analyzer 5. Condensate formed in this bubble tower is trapped out in trap 26 and removed through line 28 heat exchanger 8 to tank 30. Unvaporized oil collecting in evaporator 21 is passed through line 31, through exchanger 10, through line 32 via pump 33 to storage in 34. Vapor rising from the top of tower 25 through line 35 is condensed in condenser 36 and sent through lookbox 37 in line 39 to storage in tank 40. Unliquefied vapors are vented through vapor vent 38.

By the above method considerable heat is abstracted from the hot oil issuing from the evaporator 21 and from tower 25. The oil so heated has considerable vapor pressure and great difficulty is found in pumping this oil to and through the coil. The lines become vapor-bound and the operation of the pump may be almost entirely impossible. In order to avoid this difficulty and yet obtain the desirable heat efficiency resulting from the heat exchange in exchangers 8 and 10, I separate the light volatile products from this preheated oil before sending it to the pump and heating coils. This stripped oil is then easily pumped.

In the operation of distilling oil, especially in the tubular variety of still, a certain amount of decomposition always occurs, resulting in the formation of hydrogen sulphide and unstable hydrocarbon molecules. These may form either carbonaceous material or "gummy" constituents in the oil, or both. It is an expensive process to remove these undesirable constituents. It is well known in the art that the lower the temperature to which the oil is heated before vaporization, the less do these undesirable constituents form.

In the usual processes of fractionating, the oil must be sufficiently heated during the passage through heater coils to cause it to evaporate and the vapors must carry sufficient heat on their passage through the fractionating tower to keep the desired fractions from condensing during their relatively long period of passage up the fractionating tower and over to the condenser box.

By this process I can heat the oil to a lower temperature during the passage through the heating coil, and, consequently, the above mentioned undesirable constituents are formed in a lesser amount. This object is achieved by using the lighter fractions of the desired finished gasoline, which come from the stripping still, as a carrier in the bubble tower for the heavier fractions of the desired finished gasoline by injecting the vapors of the lighter fraction at a relatively high point in the fractioning tower, thus doing away with some of the steam heat necessary to carry over the vapors of the heavier fractions, and so, as before stated, being able to distill at a lower temperature.

As a specific example of the operation of this system the following may be recited. Crude oil is passed through the analyzer 5 and is there raised to a temperature of about 200° F. It then passes through heat exchangers 8 and 10 where it is raised an additional amount, approximating 100° F., and is evaporated in still 12. Only a very small amount of steam is added, just sufficient to act as a carrier for the vapors. The amount of crude gasoline vapors distilled out of the crude oil amounts from 8% to 10% of the crude. The residual oil issuing from the still through line 17 has been partially cooled by this evaporation so that it issues through line 17 at about 200° F. It is stripped of all light, volatile fractions, and is therefore easily pumped by pump 17' through coils 18 and is raised to about 550° F. or 600° F. It is evaporated in an evaporator 21 by aid of some steam introduced through coils 23, to form a fuel oil fraction consisting of about 60% of the crude. This fuel oil fraction, due to the evaporation in the evaporator, is partially cooled and issues from the evaporator at about 400° F. and is further cooled in heat exchanger 10 and pumped to storage, if desired, through a cooler. The fraction condensed in bubble tower 25 is a gas oil fraction consisting of about 15% of the crude. The gas oil issues from the tower at about 350° F. and is pumped through heat exchanger 8 and then through an additional cooler, if desired, to storage in tank 30. The overhead vapors which consist of about 20% to 25% of the crude oil, is crude gasoline, and this is condensed in condenser 36 and collected in tank 40.

As will be observed, a considerable proportion of light volatile hydrocarbon vapors is obtained by the heat picked up in heat exchangers. These vaporous products interfere with the operation of the pump as previously described. By removing them before passing the oil to the pump, the operation is greatly facilitated and is cheapened, since this distillation of light hydrocarbons is obtained gratis, the heat having been expended in heater 18 for the distillation of the main body of oil.

The above is not to be taken as limiting my invention, but merely as illustrative of the best manner of carrying out my invention which I claim to be:

1. A continuous process of distilling hydrocarbons which comprises, passing the hydrocarbons to be distilled in heat exchange with residual vapors, a condensate and an unvaporized fraction of the subsequent distillation; vaporizing and fractionating the thus preheated hydrocarbons in a fractionating tower to separate the lower boiling fractions present in said preheated hydrocarbons, passing the higher boiling hydrocarbons, substantially free of the lower boiling hydrocarbons, to and through a heated coil to heat said hydrocarbons; vaporizing a part of the heated hydrocarbons to form an unvaporized fraction; fractionating the vapors thus formed to form the above mentioned condensate and residual vapor, injecting the aforementioned lower boiling hydrocarbons into the last fractionating unit, so that the lower boiling hydrocarbons lower the vapor pressure of the heavier fractions from the last mentioned fractionation and assist in the vaporization of said heavier fractions.

2. A continuous process of distilling hydrocarbons which comprises, passing hydrocarbons to and through a heated coil to heat said hydrocarbons; vaporizing a part of the heated hydrocarbons; fractionating the vapors thus formed to give a condensate and residual vapor; passing the residual vapors, the condensate and the unvaporized fraction in heat exchange with hydrocarbons passing to the heating step; vaporizing a part of the thus pre-heated hydrocarbons to separate the lower boiling fraction present in said preheated hydrocarbons and injecting said lower boiling fraction into the upper part of the fractionating unit of the first mentioned fractionating step, so that the lower boiling fractions act as a carrier for the heavier fraction in the first mentioned fractionating step, and conducting the unvaporized fraction from a distillation tower employed to separate the low boiling fractions from the preheated hydrocarbons to and through said first mentioned coil.

3. An apparatus for distilling hydrocarbons which comprises, a coil situated in a furnace; an evaporator; means for passing hydrocarbons from said coil to said evaporator; a fractionating device connected to said evaporator; an analyzer; means for passing vapors from said fractionating device through said analyzer; means for withdrawing the vapors from said analyzer; means for withdrawing condensate from said fractionating device; means for withdrawing the unvaporized fraction from said evaporator; means for passing hydrocarbons through said analyzer in heat exchange with said vapors; and means for passing the last mentioned hydrocarbons in heat exchange relationship with the condensate from said fractionating device and with the unvaporized fraction from said evaporator; a second evaporator; means for passing the incoming preheated hydrocarbons from said heat exchangers to said second evaporator; a pipe connecting said second evaporator to said furnace heated coil and a pump in said line; a second fractionating device connected to said second evaporator; means for passing vapors from this fractionating device to the upper section of the first fractionating device.

In testimony whereof I affix my signature.

JOHN C. BLACK.